US006865581B1

(12) United States Patent
Cloninger, Jr. et al.

(10) Patent No.: US 6,865,581 B1
(45) Date of Patent: Mar. 8, 2005

(54) JOB ANALYSIS SYSTEM

(75) Inventors: Charles R. Cloninger, Jr., Smyrna, GA (US); Rajiv D. Pandya, Atlanta, GA (US)

(73) Assignee: iComp Health Management, Inc., Atlanta, GA (US)

( * ) Notice: Subject to any disclaimer, the term of this patent is extended or adjusted under 35 U.S.C. 154(b) by 462 days.

(21) Appl. No.: 09/587,587

(22) Filed: Jun. 2, 2000

Related U.S. Application Data

(60) Provisional application No. 60/178,441, filed on Jan. 27, 2000.

(51) Int. Cl.[7] .............................. G06F 17/00; G06F 7/00
(52) U.S. Cl. ....................... 707/104.1; 434/219; 705/11
(58) Field of Search ........................ 434/219; 705/7–11, 705/104.1

(56) References Cited

U.S. PATENT DOCUMENTS

| | | | |
|---|---|---|---|
| 5,050,213 A | * 9/1991 | Shear ........................... | 705/53 |
| 5,111,391 A | * 5/1992 | Fields et al. .................... | 705/9 |
| 5,416,694 A | * 5/1995 | Parrish et al. ................... | 705/8 |
| 5,551,880 A | * 9/1996 | Bonnstetter et al. ......... | 434/236 |
| 5,848,594 A | * 12/1998 | Matheson .................... | 128/898 |
| 6,070,143 A | * 5/2000 | Barney et al. ................. | 705/8 |

FOREIGN PATENT DOCUMENTS

| | | | | |
|---|---|---|---|---|
| JP | 04279979 A | * 10/1992 | ........... | G06F/15/60 |

OTHER PUBLICATIONS

Keyserling, W.M., T.J. Armstrong and L. Punnett "Ergonomic Job Analysis: A Structured Approach for Identifying Risk Factors Associated with Overexertion Injuries and Disorders", Applied and Environmental Hygiene, vol. 6, No. 5, pp. 353–363, May 1991.*

Mital, A. "Analysis of Multiple Activity Manual Materials Handling Tasks using A Guide to Manual Handling", Ergonomics, vol. 42, No. 1, pp. 246–257, Jan. 1999.*

St. Vincent, M., M. Lortie and D. Chicoine "Participatory Ergonomics Training in the Manufacturing Sector and Ergonomic Analysis Tools", Relations Industrielles, vol. 56, No. 3, pp. 491–512, Summer 2001.*

Cohen, A.L. et al. "A Primer Based on Workplace Evaluations of Musculoskeletal Disorders", U.S. Department of Health and Human Services, National Institute for Occupational Safety and Health, DHHS (NIOSH) Publication No. 97–117, pp. 16–30, Mar. 1997.*

Kroemer, K.H.E. Ergonomic Design of Material Handling Systems, Boca Raton:Lewis Publishers, pp. 53–74, 1997. ISBN 1–56670–224–0 T55.3.L5K76 1997.*

Fathallah, F.A., W.S. Marras and M. Parnianpour "The Role of Complex, Simultaneous Trunk Motions in the Risk of Occupation Related Low Back Disorders", SPINE, vol. 23, No. 9, pp. 1035–1042, May 1998.*

MED_TOX Online, download of www.med–tox.com, archived between Dec. 5, 1998 and Apr. 29, 1999.*

Anderson, C. "Can Employees Physically Do the Job?", Human Resources Professional, vol. 7, No. 5, pp. 3–5, Sep./Oct. 1994.*

(List continued on next page.)

*Primary Examiner*—Luke S Wassum
(74) *Attorney, Agent, or Firm*—Technoprop Colton LLC

(57) ABSTRACT

A method of performing job analyses and delivering or providing access to the results of the job analyses by creating a list of job requirements and working conditions for each discrete task of a job, creating a physical demands analysis comprising a list of physical requirements of each discrete task of a job, and combining the lists into a job analysis database for determining whether a worker can perform a job.

6 Claims, 1 Drawing Sheet

OTHER PUBLICATIONS

Ockerman, J.J. and C. Thompson "Multimedia Instruction as a Tool for Teaching Ergonomic Analysis Skills", Proceedings of the IEEE International Conference on Systems, Man and Cybernetics, vol. 4, pp. 3850–3855, Oct. 22–25, 1995.*

Landau, K., B. Imhof–Gildein and S. Mucke "On the Analysis of Sector–Related and Gender–Related Stresses at the Workplace An Analysis of the AET Data Bank", International Journal of Industrial Ergonomics, vol. 17, pp. 175–186, Feb. 1996.*

Sharp, M.A., J.F. Patton and J.A. Vogel "A Data Base of Physically Demanding Tasks Performed by U.S. Army Soldiers", Proceedings of the Human Factors and Ergonomics Society $40^{th}$ Annual Meeting, pp. 673–677, 1996.*

Bienkowski, T.L. et al. "A Comprehensive Data Base for the Design of Manual Materials Handling", Proceedings of the 8th Annual Conference on Computers and Industrial Engineering, Mar. 19–21, 1986.*

Mital, A., A.S. Nicholson and M.M. Ayoub "A Guide to Manual Materials Handling", London: Taylor & Francis, chapters 1 and 2, 1993. ISBN 0–85066–801–8.*

Montante, W.M. "An Ergonomic Approach to Task Analysis", Professional Safety, vol. 39, No. 2, pp. 18–22, Feb. 1994.*

* cited by examiner

US 6,865,581 B1

JOB ANALYSIS SYSTEM

CROSS-REFERENCE TO RELATED APPLICATIONS

This patent application claims priority under 37 CFR 1.78 of Provisional Patent Application No. 60/178,441 filed on 27 Jan. 2000.

BACKGROUND OF THE INVENTION

1. Technical Field

This invention relates generally to the field of analyzing physical activities of a job function for medical purposes and more particularly to a system and method for providing detailed job analyses to health care professionals, human resource professionals, and potential employees, to allow for a clinically oriented real time approach for a return to work determination in a current or alternative job.

2. Prior Art

The medical and physical therapy industry has been providing and performing job analyses for over thirty years. A job analysis is a depiction or description of a person's physical requirements to do a specific job. Usually, a job analysis consists of visiting the site where the specific job is to be performed, observing an employee performing the job, and then filling out a written form that includes categories to describe the lifting, standing, sitting, walking, bending, stooping, and other physical requirements of the job. The completed form usually is what a physician or other medical professional or practitioner will require when a patient or company inquires about a person's capability in performing a specific job. The completed form is referred to as a job analysis summary.

A significant amount of time and money is spent on preparing job analyses when an employee files a complaint regarding an alleged workplace related injury. Additionally, currently job analyses are generated each and every time a complaint is filed, regardless of whether an identical or similar job analysis had been prepared in the past on the same job. Further, if it is determined that an employee cannot perform the essential functions of his or her job, that employee often remains out of work even though that employee could have been reassigned to a job within the company with different essential functions during the rehabilitation time. Such lost time is an often unseen cost of doing business, sometimes leading to lost time claims and lawsuits for unlawful termination. These costs come in the form of increased insurance rates, excessive and/or unnecessary medical costs, case management expenses, and legal fees.

Thus, it can be seen that a more efficient method and system for creating and providing job analyses is desirable, including a method and system that systematizes and objectizes the job analyses system so as to reduce duplicative work, lost time, medical expenses, administrative expenses, and legal expenses, to name a few. It is to this end that the present invention is directed.

BRIEF SUMMARY OF THE INVENTION

The present invention is a significantly enhanced job analysis system, comprising novel features to increase its functionality while at the same time decreasing the overall cost in time, money and personnel. A primary feature of the invention is the creation of a standard, objective database of the physical requirements for specific jobs within a specific company, and allowing access to the database, irrespective of location, to those persons with a need to know the information in the database. This database further comprises a useful pictorial step-by-step analysis of each specific job within a company.

In its simplest form, by objectizing the functions of a job, rather than subjectizing each job to each worker, the present invention provides physicians, other health practitioners, human resource persons, and risk management persons, as well as other selected persons, the knowledge of the physical tasks required of specific jobs within a company, thus allowing a more objective determination of whether a person can perform a job, such as whether a potential employee is capable of performing a specific job, whether a job can be modified to suit a potential or existing employee, and/or whether an employee can return to work, either in the original job or in another job within the company during the rehabilitation period. Further, once an objective job analysis is created for a specific job, the job analysis can be customized to the actual person performing the job, if desired.

Once the job analysis database is created, the present invention provides a multi-tiered approach to providing information regarding the physical demands of job tasks and functions. A primary novel feature of the invention is to allow a clinically oriented real time approach to determine whether an employee can return to work in their original job or, if not, to determine a specific job within the company to which the employee can return to work. To carry out the invention, first, a task-specific job analysis is conducted of the physical requirements for each job. Second, a physical demands analysis is completed giving both a written and a pictorial description of the various functions involved in carrying out the job. Third, the job analysis and the physical demands analysis are combined into a viewable database. Fourth, the viewable database is made available to the employer and others determined by the employer that have a need to view the database.

The present invention can be used in many ways. A first use is to allow the treating physician to more completely understand the physical job requirements of the employee and make a better determination of whether and for how long the employee should not perform his or her job. A second use is to allow the treating physician to more completely understand the physical job requirements of the employee and make a better determination of whether the employee's condition is job related. A third use is to determine whether and how a job may be modified to allow the employee to come back to work sooner, or to prevent future similar conditions or injuries from occurring. A fourth use is to find alternate jobs that the employee can perform during rehabilitation. A fifth use is to allow a pre-employment viewing of the requirements of various jobs, thus allowing a better match between an employee and a job. A sixth use is to allow health care professionals to demonstrate proper body mechanics for specific job activities so as to help prevent injuries form occurring in the first place.

To these ends, a written and pictorial step-by-step analysis of each job within a company is created describing the physical requirements of each job within the company with measurable physical data. This is a key distinction between the present invention and the prior art. While the prior art provides job analyses for a specific person performing a specific job, the present invention provides job analyses for the specific job itself, which can be used throughout the company regardless of the person performing the job. The job analysis further comprises the essential functions of each job and the specific requirements for each job of what the specific worker must do to perform the job and the functions of each job that can be modified without affecting the performance of the job.

Another key distinction between the present invention and the prior art is that, if necessary, a specific job analysis can be customized to a specific person performing the job, if there are specific needs or requirements due to the specific person's abilities or limitations. This allows the present invention to be truly functional and to provide the company with the ability to make quicker decisions about whether an employee is appropriate for a particular job, whether an employee (such as an injured employee) can return to work in a particular job, and/or whether a current employee who cannot perform their current job is capable of performing other jobs within the company.

A further key distinction between the present invention and the prior art is that, if necessary, a specific job description can be modified to allow a specific employee to perform the job, or if it is determined that certain essential functions of the job are no longer necessary for any employee to adequately perform the job. This allows the present invention to be dynamic and to allow the company to keep up both with the changing needs of the company's jobs and the changing needs of the company's employees.

The present invention is configured to be functional over a global computer network such as the Internet, providing real time access and greatly decreasing the amount of time necessary to perform a job analysis and to review an employee's fit with a job or claim based on a job. The use of such a novel method allows the database to be used in performing a transferable skills analysis, and in the event litigation occurs as a result of an injury to a worker or as a result of a worker claiming a job was not adequately described prior to employment.

Thus, it is an object of the present invention to provide an enhanced job analysis system that comprises a standard, objective database of the physical requirements for jobs.

It is another object of the present invention to provide an enhanced job analysis system that allows access to the database, irrespective of location and preferably over a global computer network such as the Internet, to those persons with a need to know the information in the database.

It is another object of the present invention to provide an enhanced job analysis system that has increased functionality and decreased overall cost in time, money and personnel.

It is another object of the present invention to provide an enhanced job analysis system that allows each party to know exactly what the physical demands of a job are by, in part, including a pictorial step-by-step analysis of a job.

It is another object of the present invention to provide an enhanced job analysis system that can give a physician assurance that the job he or she is releasing the patient to do is within the physical capability, or can be modified to be within the physical capability, of the patient.

It is another object of the present invention to provide an enhanced job analysis system that allows one to modify specific tasks within a job's specifications to the satisfaction of all appropriate parties.

It is another object of the present invention to provide an enhanced job analysis system that helps to reduce the amount of time an employee is out of work by reducing return visits to a physician due to complaints that the physician does not understand the job requirements.

It is another object of the present invention to provide an enhanced job analysis system that insures that physical therapists know the physical job requirements so that proper body mechanics can be taught to the employees.

It is another object of the present invention to provide an enhanced job analysis system that insures that work hardening goals are consistent with the physical demands for a successful return to work.

It is another object of the present invention to provide an enhanced job analysis system that reduces confusion at hearings or other legal or professional proceedings regarding the specific physical actions required for a return to work.

It is another object of the present invention to provide an enhanced job analysis system that eliminates the need for duplicative job analyses being performed by different rehabilitation professionals for the same position regardless of location.

It is another object of the present invention to provide an enhanced job analysis system that complies with the Americans with Disabilities Act (ADA) requirements.

These objects, and other objects, features and advantages of the invention will become more apparent to those of ordinary skill in the art when the following detailed description of the preferred embodiments is read in conjunction with the attached appendices that provide a representation of the process.

DETAILED DESCRIPTION OF THE PREFERRED EMBODIMENTS

Figure 1:
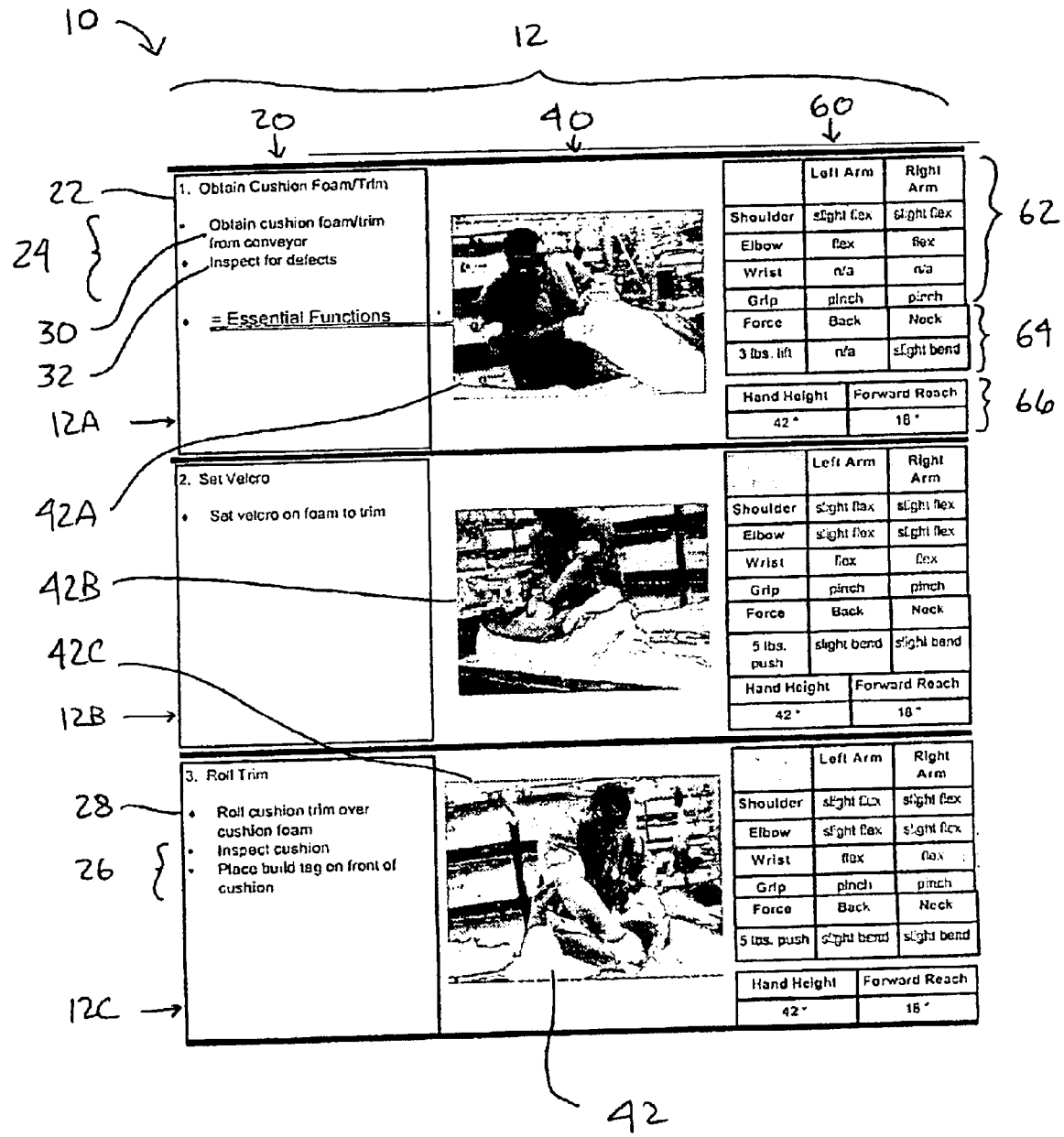
FIG. 1 is a screen capture of an illustrative example of an embodiment of a physical demands analysis for the job analysis database suitable for the present invention.

The present invention is a significantly enhanced job analysis system, comprising novel features to increase its functionality while at the same time decreasing the overall cost in time, money and personnel. The present invention is designed for use in the hiring process for potential employees, in the review process for employees filing an injury complaint, in the legal process in dealing with ADA complaints or lawsuits, and in other essential physical and health related aspects of employment. A primary feature of the invention is the creation of a standard, objective pictorial database of the requirements for specific jobs within a specific company, and allowing access to the database, irrespective of location, to those persons with a need to know the information in the database. In its simplest form, the present invention will provide physicians, other health practitioners, human resource persons, and risk management persons, as well as other selected persons, the knowledge of the physical tasks required of specific jobs within a company, thus allowing a more objective determination of whether a person is suitable for a job, such as whether a potential employee is capable of performing a specific job, whether a job can be modified for a potential or existing employee, and/or whether an employee can return to work, either in the original job or, if not, in another job within the company during the rehabilitation period.

The present invention is a multi-tiered approach to providing accurate, up-to-date and updateable information regarding the physical requirements of job tasks and functions. First, a task-specific job analysis is conducted of the physical requirements for each job. Second, a physical demands analysis is completed giving both a written and a pictorial description of the various functions involved in carrying out the job. The pictorial description can be in the form of pictures, video, graphical representations, or animation. Third, the job analysis and the physical demands analysis are combined into a viewable database. Fourth, the viewable database is made available to the employer and others determined by the employer that have a need to view the database. The viewable database can be made available through many media means, with CD-ROM and Internet based being the media of choice based on current technology.

The present invention can be used in many ways. A first use of the preferred embodiment is for presentation to the treating physician so that the treating physician can more completely understand the physical job requirements of the employee and make a better determination of whether and for how long the employee should not perform his or her job. A second use of the preferred embodiment is so that the treating physician can more completely understand the physical job requirements of the employee and make a better determination of whether the employee's condition is job related. A third use of the preferred embodiment is so that, with a physician's input, as well as the input of other health care and company persons, a job may be modified to allow the employee to come back to work sooner, or to prevent future similar conditions or injuries from occurring. A fourth use of the preferred embodiment is to find alternate jobs that the employee can perform during rehabilitation. A fifth use of the preferred embodiment is to allow company persons and prospective employees view the requirements of various jobs, thus allowing a better match between an employee and a job. A sixth use of the preferred embodiment is to allow health care professionals demonstrate proper body mechanics for specific job activities so as to help prevent injuries form occurring in the first place.

In its preferred general embodiment, the present invention comprises improvements over prior art job analysis techniques, including a new and improved method of performing job analyses and delivering or providing access to the results of the job analyses. A first improvement provided by the present invention, and a key distinction over the prior art, is a searchable job specific database of job analyses and physical demands requirements that allows, among other things, a real time determination of both whether an employee can perform a certain job, and whether there is a specific job that is suitable for a specific employee. This allows both a faster return to work for an injured employee (either in the employee's original job or in an alternative job) and a better match between an employee and a job.

A second improvement provided by the present invention is the inclusion of certain functions required by the ADA that are not included in job analyses produced by other entities. For example, in part due to the rise in computer usage, which has resulted in an increase in hand and arm injuries, the job analyses of the present invention includes a section dedicated to analyzing arm and head injuries due to computer usage. A third improvement provided by the present invention is the ability to add additional requirements and/or variances for a particular employee performing a particular job. When looking at a particular job on a nationwide basis, slight variations in the job requirements may exist due to regional, gender or age differences. For example, part of one bank teller's written job duties may include carrying bags of coins from the teller stations to the bank vault for the other, less strong, tellers.

Shown at Appendix A are common definitions of terms for physical requirements that are used in the present method. These terms are taken from The Revised Handbook For Analyzing Job published by the US Department of Labor, Employment and Training Administration in 1991.

Shown at Appendix B is a representative Job Analysis Summary created by the present method.

Shown at Appendix C is a representative Physical Demands Analysis created by the present method.

Preferably, the job analysis summary is in written form and includes specific notations of the essential functions of the position that an employee must be able to perform in order to do the job. In general, jobs are analyzed in terms of elements and tasks. An element is the smallest step into which it is practical to subdivide any work activity without analyzing the separate motions, movements and mental processes involved. A task is one or more elements and is one to the distinct activities that constitute the logical and necessary steps in the performance of work by the worker. Further, jobs may be broken down in terms of positions. A position is a collection of tasks constituting the total work assignment of a single worker. A job is a group of positions within an employment setting that are identical with respect to their major or significant tasks and sufficiently alike to justify their being covered by a single analysis.

First, the job is given a generic title. Second, a brief description of the job activities is created in terms of what the employee is accomplishing and what the employee physically needs to do. Third, a list is created of the essential functions that the employee must be able to do to perform the job properly. These essential functions then are broken down into the various physical requirements, which preferably comprise one or more of the fourth through ninth steps listed immediately below. Fourth, a list is created of the strength requirements of the job. Fifth, a list is created of the physical requirements of the job. Sixth, a list is created of the frequencies of certain motions and movements necessary to perform the job. Seventh, a list is created of the working conditions under which the job is performed. Eighth, a list is created of certain flexions necessary for the arms and hands to perform the job. Ninth, a list is created detailing some of the types of motions and the maximum strengths necessary to perform the job. Tenth, a list is created of the specific or additional requirements necessary of a specific employee for the specific job at the specific workstation. The preferred job analysis further comprises a section for a physician to indicate his or her review and approval of the job analysis. Although these are the preferred steps, it will be recognized by those of ordinary skill in the art that all of these steps are not essential, and other steps can be added or substituted, without departing in scope from the invention.

Referring now to Appendix B, a representative job analysis is shown for an A Line Operator at an automobile seat assembly plant. The position title is A Line Operator. The position description describes briefly what the A Line Operator is expected to do to perform the job properly. The essential functions include activities such as lifting a certain amount of weight, the primary position the employee will be in, what parts of the body the employee primarily will use, and any other functions the employee will have to perform to perform the job properly. These first three items preferably are in prose form.

Following the essential functions are charts or other graphical representations of the next six items of the job analysis summary. The strength requirements of the job are given based on the amount of weight to be lifted or otherwise acted on by the employee and the frequency of lifting or otherwise acting on the amount of weight. It has been found suitable to divide the amount of weight into specific ranges of weights, and to divide the frequency into specific percentage ranges of frequency. The physical requirements of the job are given based on the specific motion or movement to be made by the employee and the frequency of making the motion or movement. It has been found suitable to divide the frequency into specific percentage ranges of frequency. The frequencies of certain motions and movements necessary to perform the job are given based on the actual arm and leg motions and movements to be made by the employee and which arm or leg (neither, left, right or both) is to be used and how often the motion or movement must be made. It has been found suitable to divide the frequency into specific quantitative amounts.

The general working conditions under which the job is performed are listed. It has been found suitable simply to indicate whether a certain working condition will be encountered using a yes or no chart. The flexions necessary for the arms and hands to perform the job are given and preferably include whether the wrist, elbow and shoulder need to be twisted, flexed and/or extended by the employee to perform the job. It has been found suitable simply to indicate whether a certain flexion is necessary and by which portion of the arm. The types of motions and the maximum strengths necessary to perform the job are given and preferably include the grips, reaches, lifts and forces that are necessary by the employee to perform the job. It has been found suitable simply to indicate whether a specific grip, reach or lift is required, and the maximum distance of the reach, the maximum weight of the lift, and the maximum number of push and pull forces required.

As a further novel and useful feature, a list is created of the specific or additional requirements necessary of a specific employee for the specific job at the specific workstation. This helps tailor the job analysis to the specific position, which in turn helps all persons involved to determine whether a specific employee is capable of performing a specific job and, if not, what job(s) he or she is capable of performing. Likewise, a section is provided for a physician to indicate his or her review and approval of the job analysis for the particular employee or in general, and which aspects of the job analysis were reviewed. This acts as a further check on the physician's determination of whether the employee is capable of performing a specific job.

In a first embodiment of the physical demands analysis, the various action steps of an essential function are broken down and represented by sequential pictures. Using this technique, a physician is able to look at the pictures and rapidly formulate an opinion about whether an employee is suitable for a specific job, and vice versa, rather than having to read the text and attempt to extract the actual risks and strains associated with the essential function. The pictorial physical demands analysis allows the physician to see what the actual worksite looks like in sequential pictures of an actual person performing the job and what movements a person will have to make in performing the job. The text accompanying the picture provides information such as how much force must be exerted by the employee in carrying out the physical aspects of the job, the amount of weight an employee may be expected to lift or otherwise move, the frequency that a certain motion or movement is required, what position(s) the employee must be in, what position an employee must hold his or her back, how high the employee must reach, or the like. Thus, the physician is able to obtain a clear picture of what the person must do to perform the essential functions of the job.

In a second embodiment, the pictorial physical demands analysis can be provided in the form of a video. The physical demands analysis then can be presented to the physician with a full representation of how the job must be performed, and allows the physician to make a more complete determination of whether the employee can perform the job. Although a video is more complete, it also is much more computer memory and telecommunications bandwidth intensive, and not as concise as pictures. Thus, in most situations pictures are preferred, while in other situations video is preferred. In a third embodiment, the pictorial physical demands analysis can be provided in the form of graphical representations, such as stick figures or cartoons. Although this form is less accurate, it also is less resource intensive. In a fourth embodiment, the pictorial physical demands analysis can be provided in the form of animation. Although this form also is less accurate, it is less resource intensive than a real video, while still showing a representation of the employee in motion when performing the job.

The physical demands analysis is in written and pictorial form and includes a first section comprising the specific steps of the job including the essential functions, a second section comprising a pictorial representation of the specific steps, and a third section listing the physical requirements of the steps. In this component, each action step of the job is described, is shown pictorially, and the physical requirements of the action are listed. The physician, or other qualified person, views both the job analysis and the physical demands analysis when making a determination whether the employee can return to work in the same or a different job. Optionally, there is an attachment form for the potential employee to sign to indicate that he or she has reviewed the requirements for the position as described in the job analysis and the physical demands analysis. Thus, if the potential employee is hired and later indicates medical or other conditions that would preclude him or her from performing the job, the employee and the form can be reviewed by the appropriate persons for an evaluation of the employee's continued employment and/or the employee's capability to perform the job safely.

To create the physical demands analysis, first, the generic job title and the brief description are repeated from the job analysis summary. Second, generic sub-listings of the department of the company in which the job is and the generic task name are given. Third, as illustrated in FIG. 1, a three-part screen 12 is created with the first section 20 showing the tasks of the job, the second section 40 showing a pictorial representation of the tasks, and the third section 60 showing the physical requirements of the tasks 60. This screen 12 is repeated sequentially 12A, 12B, 12C to show each discrete task required to perform the job. Although these are the preferred steps, it will be recognized by those of ordinary skill in the art that all of these steps are not essential, and other steps can be added or substituted, without departing in scope from the invention.

Referring now to Appendix C and FIG. 1, a representative physical demands analysis 10 is shown for the A Line Operator at an automobile seat assembly plant used as an example in the prior discussion of the job analysis. The opposition title is A-Line Sub Assembly Operator. The position description describes briefly what the A Line Sub-Assembly Operator is expected to do to perform the job properly. The department is given as A Line. The specific task that is the subject of the physical demands analysis is Cushion Trim to Foam.

The first section 20 of the three-part screen 12 is a written description 22 of the specific task, along with a listing of the physical functions 24 necessary to carry out the task. The physical functions preferably are divided into non-essential 26 functions and essential 28 functions. For the example task shown (1. Obtain Cushion Foam/Trim), there are physical functions. The first physical function 30, obtain cushion foam/trim from conveyor, is not designated as an essential function possibly because someone besides the A-Line Sub Assembly Operator could do this function. The second physical function 32, inspect for defects, is designated an essential function possibly because the A-Line Sub Assembly Operator must make the determination of whether the cushion foam/trim has defects.

The second section 40 of the three-part screen 12 is a pictorial representation 42 of the specific task. This pictorial representation can be one or more of several different types. The preferred type is a picture of the specific task as a representative employee is performing it. A second preferred type is a video of the specific task as a representative employee is performing it. Alternative types include graphical depictions, such as stick or cartoon people, and animation showing the specific task as it is being performed. The video or animation can be played in this second section 40 while the screen 12 is being viewed. This second section 40 of the three-part screen 12 allows the physician or other appropriate person(s) to view an actual person performing the actual job, thus allowing the physician or other appropriate person(s) to make a better determination of whether the employee can perform the job.

The third section 60 of the three-part screen 12 is a written listing of the physical requirements of the specific task. This third section 60 comprises various charts 62, 64, 66 of the physical requirements of the task and can be customized for each task or job. As shown in the example of Appendix C and FIG. 1, three different physical requirement charts were deemed suitable for the specific tasks to be performed. The first chart 62 shows the motions or movements the shoulder, elbow, wrist and grip of the left and right arms that the employee needs to make to perform the task. The second chart 64 shows the force necessary to perform the task, and the motions of the back and neck that the employee needs to make to perform the task. The third chart 66 shows the hand height and forward reach that the employee needs to make to perform the task. Various other information can be included or substituted in the third section 60 as determined necessary or desirable by the physician or other appropriate person(s).

In conducting an on-site physical demands analysis, each element or task of the job is analyzed in terms of its physical demands. Tasks are photographed and/or videoed. Accompanying the pictorial representation is data regarding the physical demands. The physical demands noted for each task summarize the maximum physical demands for all of the elements necessary to perform that task. Strength requirements can be obtained using standard job analysis equipment including a tape measure to measure height and reach, a scale to measure weight, and a push-pull ergometer to measure push-pull forces. Preferably, weights and forces are measured three or more times and averaged.

The pictorial physical demands analysis component of the present invention as illustrated in the second section 40 shown in FIG. 1 includes pictorial representations of certain essential functions of a job. In the pictorial demands analysis, the various action steps of an essential function are broken down and represented graphically by, for example, sequential pictures 42A, 42B, 42C, a video, graphical representations, or animation. Using this pictorial technique, one is able to view the physical aspects and essential functions of a particular job and formulate an opinion as to whether the employee is physically capable of performing the job. The pictorial physical demands analysis allows one to see what the actual worksite looks like and what movements a person will have to make in performing the job, eliminating the possibility that, for example, a physician will have to formulate a medical opinion without knowing what the actual worksite looks like. Thus, one is able to obtain a clear picture of what the person must do to perform the essential functions of the job.

The present invention comprises a novel system and method for providing all of the job analyses if a company quickly and easily and to a widely dispersed audience. In a first embodiment, the invention is available to persons over a global computer network such as the Internet. A specific database of job analyses for a specific company can be accessed through a single provider's network portal, such as a World Wide Web site. Persons could log on to the site and access the desired job analysis and/or physical demands analysis and, if necessary, print out the desired pages. In this way, a single database for each company could be maintained and kept up to date for the company. Likewise, the distribution would be simple, and would eliminate the need to constantly send out new CDs or other storage media to the necessary persons. Further, physicians who are members of a particular insurance network, or who are preferred by a specific company, could easily log on to the company's database through the computer network and access the company's database without having to deal with one or more separate CDs of information.

In a seocnd embodiment, all of the job analyses are included on a CD-ROM or other portable storage media. Everything that would normally be provided in a hard copy of the job analysis is on the CD-ROM. Thus, in a representative example, a company may have locations in different states, with a centralized risk management department. If an employee lodges a complaint in one location, the human resources person at that location can send the complaint to the risk management department at the headquarters in another state, and request that the employee be sent to the physician the very next day. To facilitate the physician's examination and determination of whether the employee can continue to perform his or her employment, the human resources person would send a job analysis for the specific job to the physician. This would allow the physician to determine whether the employee's symptoms are a result of the employee's job and to make recommendations on how to alleviate the symptoms.

Under the current art, a company would hire a job analysis firm to visit the employee's place of work, to observe the employee at work, and to prepare a job analysis. This process could take on the order of one to several weeks to complete. The present invention greatly decreases the time for reviewing an employee's claim, of for matching an employee to a job, by allowing the human resources person to generate a job analysis and send the job analysis to the physician, if necessary, simply by reviewing and selecting the appropriate job analysis from the present system. Upon completion, the human resources person can send the job analysis to the physician via e-mail or the like. Alternatively, the physician, if authorized, could access the job analysis database for the company, and look up the employee's job analysis when the employee visits the physician. Alternatively, the CD-ROM could be sent to the physician, or could be maintained at the remote location where it could be transported to the treating physician's office.

There are many ways that the invention can be used. A first preferred use is for presentation to a treating physician so that he or she can more completely understand the physical job requirements that a specific employee must undertake. This will help the physician determine whether the employee is physically capable of performing the job functions. This also will help the physician determine if the employee's injury is job-related, and whether the employee can perform other jobs at the company during rehabilitation.

A second preferred use is to determine how a job can be modified so that the employee can return to work safely while still undergoing medical care or rehabilitation. The job analysis and the physical demands analysis can be reviewed with physicians, physician's assistants, occupational therapy professionals, risk management professionals and the like for a more complete review. The ability to more easily modify a job's requirements will, among other things, allow an employee to return to work sooner and lessen lost time and money for both the employee and the company.

The showing of the required job duties to the physical therapist or work hardening specialist encourages modalities that will return the employee to a similar level of work. Further, a therapy program can be designed that will restore an employee's functions to pre-injury levels by providing the therapist knowledge of the physical activities that will be required of the employee for a safe return to work. Additionally, one can determine what job tasks will need to be modified permanently so that the employee can return to work in a meaningful manner. Even further, one can determine whether an employee will not be able to return to work in the same job, even with modifications, and can help the employee search for another job within the same company. All of this can be done at an early stage, or as a preventative measure, rather than maintaining an unrealistic hope of returning an employee to work in a previous job.

A third preferred embodiment is to allow the physical therapist a review of the requirements of a specific job such that the therapist can help an employee with the proper body mechanics for performing a specific job. Often, improper body mechanics are the cause for injury in the first place. A preview of the proper body mechanics, and sessions with the employees regarding body mechanics, will result in fewer injuries.

To carry out the preferred method of the present invention, first, a job analysis is created by listing all of the job requirements and working conditions. Second, a physical demands analysis is created by coordinating the essential functions of each of the job's tasks and the physical requirements of each of the job's tasks with a pictorial representation of each of the job's tasks. Third, the job analysis and the physical requirements analysis are repeated for each discrete job within a company. Fourth, the various job analyses and physical demands analyses are combined to create a company specific job analysis system database. Fifth, the job analysis system database is made available to those with a need to know the database, such as physicians and company officials.

The combination of the data shown in Appendices B and C using the present invention provides a useful, new and unobvious method and system for providing real time job analysis to physicians, other health care professionals, human resource persons, risk management persons, and employees, saving time, money, and human resources in a manner heretofore not done. The invention is designed for use by a wide variety of persons, including those of local companies, local office employees of national companies, national employees (such as those located in the headquarters), and national employees of international companies.

An important component of the present invention, and one that distinguishes the present invention from the prior art, is the novel search engine that allows the job analyses database to be searched for an appropriate job for an employee, or for alternative positions that an employee can perform during the injury and/or rehabilitation period. Currently, an injured employee is evaluated relative to his or her current position. If the injured employee is unable to perform his or her current position, he or she is put on medical leave until he or she can return to work in his or her current position. This is an inefficient use of an employee who otherwise is capable of performing other jobs. Being out of work can effect an employee psychologically and can have a negative effect on a company.

The present invention helps companies and employees avoid out of work situations and hasten a return to work, either in the same position or in an alternative position. Use of the search engine can find alternative jobs that the injured employee can do, and the injured employee can return to work in such an alternative position. This reduces the negative psychological effect being out of work can have on an employee, and the negative economic effect having an employee out of work can have on a company. The company can fill a position with a valued employee, saving the payment of a salary for an unnecessary additional employee, whole not paying an employee for taking unnecessary medical leave.

For example, in use, the search engine can allow searching by maximum weight the employee is able to lift, maximum frequencies of motion or movement an employee is able to do, and/or the physical activities the employee is able to do. Typical click-down boxes and screens are suitable for this type of search engine. Similarly, this type of search engine can be used in the employment process by allowing the employee to input his or her physical limitations into the search engine screen. Jobs that the company has available then will be returned, and the employee and the human resources person can decide if the employee is right for the job.

Thus, it can be seen that the present invention provides a useful, novel and non-obvious method for determining whether an employee can return to work after an injury in the employee's original position or in an alternative position, for determining whether there is an alternative position within an organization for an employee who is no longer able temporarily or permanently to perform the employee's original job, and for matching an employee to a specific position within an organization. As disclosed above, the method creates reusable job analyses for a specific job within an organization, which can be customized to a specific employee if necessary, rather than non-reusable individualized job analyses for a specific person performing a specific job. This functional job analysis system allows the user to make clinical decisions with specific injuries in mind, so that a specific job can be changed to accommodate an injured employee and/or a specific employee can be matched to an alternative job. Unlike any of the prior art systems, the search functionality and the job modification functionality of the present invention allow an employee to return to work sooner either in a modified version of the employee's original job or in an alternative job. Finally, because the job analysis database is available real time, it can be modified and accessed real time, thus significantly reducing the time it takes to make a determination of whether an employee can return to work in the employee's original position, in a modified position or in an alternative position.

The above description of preferred embodiments and attached appendices are for illustrative purposes only and are not intended to limit the spirit and scope of the invention, and its equivalents, as defined by the appended claims.

What is claimed is:

1. A method for performing job analyses of discrete jobs comprising the steps of:
   a) creating a job analysis comprising a list of job requirements and working conditions of each discrete job;
   b) creating a physical demands analysis comprising a list of physical requirements necessary for a human to be capable of in the performance of each task comprising each discrete job by listing a generic job title and a brief description of each discrete job, listing generic sub-listings of a department of the company in which each discrete job is and a generic task name, and creating a three-part screen showing tasks of the job, a pictorial representation of the tasks, and physical requirements of the tasks;
   c) repeating steps a and b for each discrete job;
   d) combining the results of step c and storing said results in a computer-implemented job analysis database; and
   e) retrieving from said database the results of the job analyses and displaying said results in said three-part screen on a computer-implemented graphical user interface.

2. The method as characterized in claim 1, wherein the step of creating the three part screen is repeated sequentially to show each discrete task required to perform each discrete job.

3. A method for performing job analyses of discrete jobs comprising the steps of:
   a) creating a job analysis comprising a list of job requirements and working conditions of each discrete job by giving each discrete job a generic title, creating a brief description of job activities for each discrete job, creating a list of essential functions that an employee must be able to do to perform each discrete job properly, creating a list of strength requirements of each discrete job, creating a list of physical requirements of each discrete job, and creating a list of frequencies of certain motions and movements necessary to perform each discrete job;
   b) creating a physical demands analysis comprising a list of physical requirements necessary for a human to be capable of in the performance of each task comprising each discrete job by listing a generic job title and a brief description of each discrete job from the job analysis, listing generic sub-listings of a department of the company in which each discrete job is and a generic task name, and creating a three-part screen showing the tasks of the job, a pictorial representation of the tasks, and physical requirements of the tasks;
   c) repeating steps a and b for each discrete job; and
   d) combining the results of step c into a job analysis database.

4. The method as characterized in claim 3, wherein the step of creating the three part screen is repeated sequentially to show each discrete task required to perform each discrete job.

5. A method for performing job analyses for discrete jobs comprising the steps of:
   a) creating a job analysis comprising a list of job requirements and working conditions of each discrete job, including a description of job activities, a list of essential functions that an employee must be able to do to perform each discrete job properly, one or more lists of physical requirements of each discrete job, and a list of working conditions under which each discrete job is performed;
   b) creating a physical demands analysis comprising a list of physical requirements necessary for a human to be capable of in the performance of each task comprising each discrete job, including a description of each discrete job; and a three-part screen showing the tasks of the job, a pictorial representation of the tasks, and the physical requirements of the tasks;
   c) repeating steps a and b for each discrete job; and
   d) combining the results of step c into a job analysis database.

6. The method as characterized in claim 5, wherein said job analysis further comprises a list of flexions necessary for the arms and hands to perform each discrete job, a list of motions and maximum strengths required in the performance of each discrete job, and a list of specific or additional requirements necessary of a specific employee for each discrete job at a specific workstation.

* * * * *